US012518308B2

(12) United States Patent
Yee et al.

(10) Patent No.: US 12,518,308 B2
(45) Date of Patent: Jan. 6, 2026

(54) SYSTEMS AND METHODS FOR DETERMINING SIMILARITY OF ONLINE ITEMS

(71) Applicant: Capital One Services, LLC, McLean, VA (US)

(72) Inventors: Bryant Yee, Silver Spring, MD (US); Brian Mcclanahan, Hyattsville, MD (US); Cruz Vargas, Ocean Springs, MS (US)

(73) Assignee: Capital One Services, LLC, McLean, VA (US)

( * ) Notice: Subject to any disclaimer, the term of this patent is extended or adjusted under 35 U.S.C. 154(b) by 613 days.

(21) Appl. No.: 17/820,401

(22) Filed: Aug. 17, 2022

(65) Prior Publication Data

US 2024/0062266 A1 Feb. 22, 2024

(51) Int. Cl.
*G06Q 30/00* (2023.01)
*G06Q 30/0601* (2023.01)

(52) U.S. Cl.
CPC .............. *G06Q 30/0629* (2013.01)

(58) Field of Classification Search
CPC ............................... G06Q 30/0629
See application file for complete search history.

(56) References Cited

U.S. PATENT DOCUMENTS

| 10,867,340 | B1 | 12/2020 | Gauvin et al. | |
| 11,200,445 | B2* | 12/2021 | Afshar | G06N 3/08 |
| 2015/0127490 | A1* | 5/2015 | Puertas | H04M 1/72457 705/26.62 |
| 2018/0197223 | A1 | 7/2018 | Grossman | |
| 2022/0092105 | A1 | 3/2022 | Barros et al. | |
| 2025/0086694 | A1* | 3/2025 | Brawer | G06Q 30/0603 |

OTHER PUBLICATIONS

Katukuri, Jayasimha, et al. "Recommending similar items in large-scale online marketplaces." 2014 IEEE International Conference on Big Data (Big Data). IEEE, 2014.*

* cited by examiner

*Primary Examiner* — Kathleen Palavecino
(74) *Attorney, Agent, or Firm* — Bookoff McAndrews, PLLC

(57) ABSTRACT

Disclosed are methods and systems for determining similarity of online items. For instance, an identifier of a first web page associated with a first item navigated to by a browser may be received from a browser extension application executing on a computing device. Image(s) and text may be extracted from the first web page and provided as input to a machine learning model along with image(s) and text extracted from a second web page of a plurality of web pages associated with a second item of a plurality of items that are stored in a data store. A probability at/above a predefined threshold that the first and second items are the same item may be received as output. A notification indicating identification of the second item as the same item and including information associated with the second item may be generated and provided to the browser extension application for display.

20 Claims, 5 Drawing Sheets

SYSTEMS AND METHODS FOR DETERMINING SIMILARITY OF ONLINE ITEMS

TECHNICAL FIELD

Various embodiments of this disclosure relate generally to techniques for determining a similarity between online items, and, more particularly, to systems and methods for generating similar item notifications.

BACKGROUND

There are billions of web pages on the Internet, and web pages are constantly being added, removed, and/or modified. Each web page may include a variety of different types of content, such as images, text, video, audio, etc. Several different web pages may often include the same or similar content. For example, for different online merchants selling a same item, the same or similar images and/or keywords and descriptor text provided by a manufacturer of the item may be displayed on the merchants' respective web pages for the item. Identifying web pages having the same or similar content may facilitate and/or enhance traditional web-based searching and/or navigation. However, due to the exorbitant number of web pages that exist compounded by the variety of different content types included in web pages that may be used for similarity determinations and constant web page modifications, such identification may be computationally-resource intensive. This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining similarity of online items. The methods and systems may enable generation of a similar item notification based on the similarity determination.

For instance, a computer-implemented method for determining similarity of online items may include extracting and storing, in a data store, one or more images and text from each web page of a plurality of web pages associated with an item of a plurality of items. The one or more images and text from each web page may be stored relative to one another according to a data structure. The method may also include receiving, from a browser extension application executing on a computing device, an identifier of a first web page navigated to by a browser executing on the computing device, where the first web page is associated with a first item, and extracting one or more images and text from the first web page. The method may further include receiving, from the data store, one or more images and text from a second web page of the plurality of web pages associated with a second item of the plurality of items, providing the one or more images and the text from the first web page and the one or more images and the text from the second web page as input to a machine learning model trained to predict whether the first item and the second item are a same item, receiving, as output from the machine learning model, a probability at or above a predefined threshold that the first item and the second item are the same item, and generating a notification indicating identification of the second item as the same item as the first item and including information associated with the second item. The method may yet further include selecting, from the plurality of web pages, a third web page associated with a third item from the plurality of items for which one or more images and text of the third web page are provided as input to the machine learning model along with the one or more images and the text from the first web page to predict whether the first item and the third item are a same item, where the selection may be based on a position of the third web page relative to the second web page within the data structure and the prediction that the first item and the second item are the same item, and the notification may be updated if the first item and the third item are predicted to be the same item, and providing the notification to the browser extension application for display on the computing device.

A system for determining similarity of online items may include a data store storing one or more images and text extracted from each web page of a plurality of web pages associated with an item of a plurality of items, at least one memory storing instructions, and at least one processor operatively connected to the at least one memory and configured to execute the instructions to perform operations. The operations may include receiving, from a browser extension application executing on a computing device, an identifier of a first web page navigated to by a browser executing on the computing device, where the first web page is associated with a first item, and extracting one or more images and text from the first web page. The operations may also include receiving, from the data store, one or more images and text from a second web page of the plurality of web pages associated with a second item of the plurality of items, providing the one or more images and the text from the first web page and the one or more images and the text from the second web page as input to a machine learning model trained to predict whether the first item and the second item are a same item, and receiving, as output from the machine learning model, a probability at or above a predefined threshold that the first item and the second item are the same item. The operations may further include generating a notification indicating identification of the second item as the same item as the first item and including information associated with the second item, and providing the notification to the browser extension application for display on the computing device.

A computer-implemented method for determining similarity of online items may include extracting and storing, in a data store according to a data structure, one or more images and text from each web page of a plurality of web pages associated with an item of a plurality of items. The method may also include receiving, from a browser extension application executing on a computing device, an identifier of a first web page navigated to by a browser executing on the computing device, where the first web page is associated with a first item, and extracting one or more images and text from the first web page. The method may further include receiving, from the data store, one or more images and text from each of a subset of web pages of the plurality of web pages associated with a subset of items of the plurality of items, where the subset of web pages may be selected based on the tree structure, for each respective web page of the subset of web pages associated with a respective item of the subset of items, providing the one or more images and the text from the first web page and the one or more images and the text from the respective web page as input to a machine learning model trained to predict whether the first item and the respective item are a same item, and receiving, as output from the machine learning model, a probability that the first item and the respective item are the same item. The method may yet further include identifying one or more respective items of the subset of items as the same item as the first item based on the probability that the first item and the one or more respective items of the subset of items is above a predefined threshold, generating a notification indicating identification of the one or more respective items of the subset of items as the same item as the first item and including information associated with the one or more respective items of the subset of items, and providing the notification to the browser extension application for display on the computing device.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
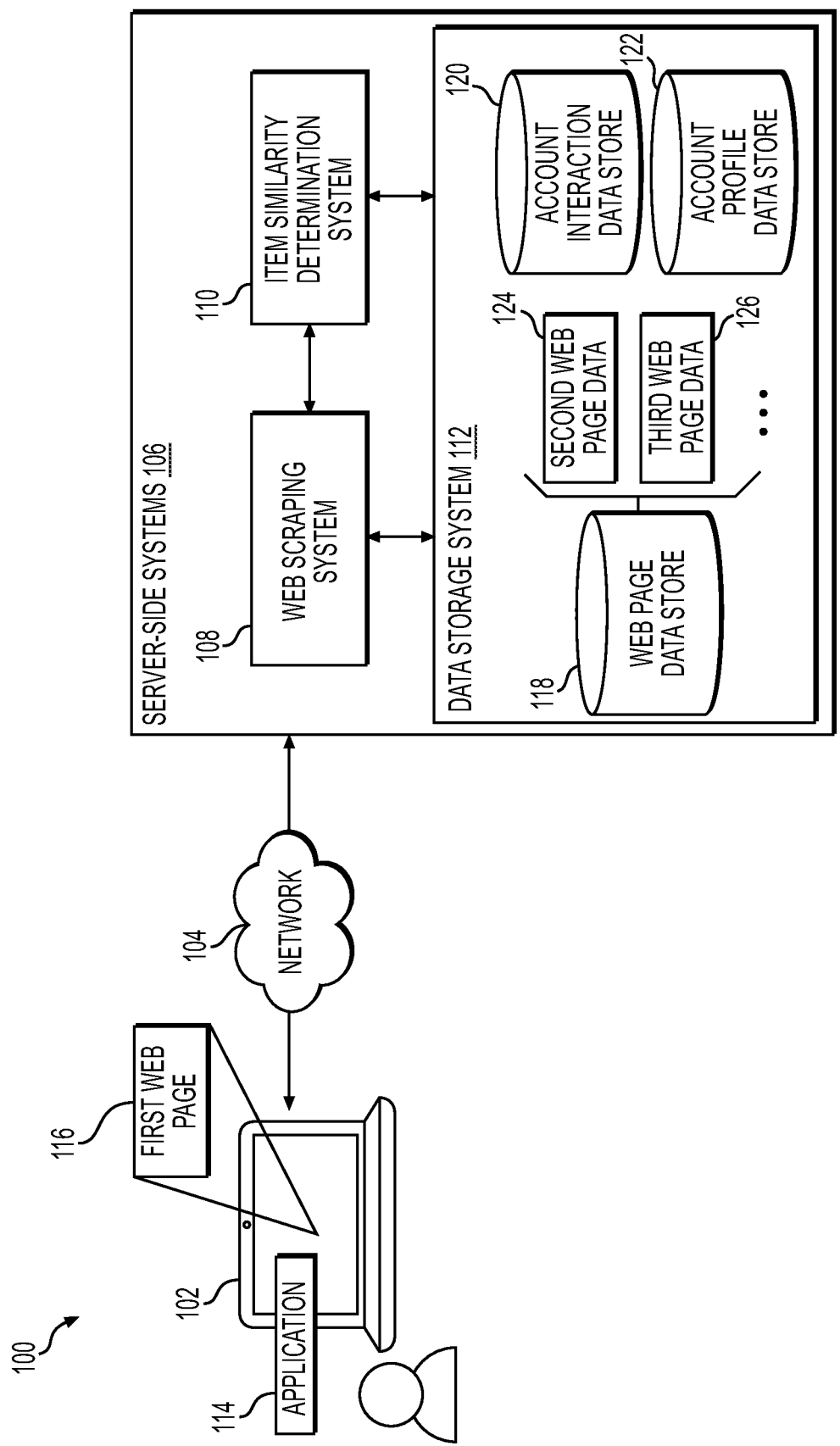
FIG. 1 depicts an exemplary environment for determining similarity of online items, according to certain embodiments.

According to certain aspects of the disclosure, methods and systems are disclosed for determining similarity of online items.

As will be discussed in more detail below, in various embodiments, systems and methods are described for generating and providing notifications to indicate one or more online items that are determined to be a same item or a similar item to an online item of interest based on similarity of content, including text and/or images, between web pages associated with the items. The online item of interest may be a first item being viewed and/or interacted with, or that is otherwise identified, via a computing device of a consumer.

As briefly discussed above, there are billions of web pages on the Internet, and web pages are constantly being added, removed, and/or modified. Each web page may include a variety of different types of content, such as images, text, video, audio, etc. Several different web pages may often include the same or similar content, and identifying these web pages may facilitate and/or enhance traditional web-based searching and/or navigation. Systems and methods are described herein for identifying two or more web pages that include the same or similar content using a trained machine learning model. The trained machine learning model may iteratively perform similarity determinations between content of a first web page and content of a subset of (rather than all) other web pages scraped from the Internet in a computationally conservative manner, as described in more detail below. A notification may then be generated to indicate the identified similarity in content between the two or more web pages.

As one illustrative example, different web pages associated with a same item (e.g., product pages) may include the same or similar content. For example, different online merchants selling similar types of items may each source an item from a same manufacturer. In fact, the online merchants typically use the same images and/or keywords and descriptor text provided by the manufacturer when displaying the item on their web pages. Therefore, a first web page of a first online merchant for an item may include the same or similar images and/or text as a second web page of a second online merchant for the same item. However, each of the online merchants may rename and/or markup a price of the item. Additionally, other factors associated with the purchase of the item, such as shipping costs and delivery timeframe, may vary between the online merchants. Resultantly, consumers may unknowingly purchase the item from the first online merchant, when it may be more advantageous to have purchased the same item from the second online merchant due to a lower item price, lower shipping costs, and/or more desirable delivery time frame, among other examples. In such examples, identification of the same or similar item based on a similarity determination of text and/or images between the first and second web pages (among other web pages associated with the same item), and generation of a notification to indicate the identified same or similar item may facilitate and/or enhance traditional web-based searching and/or navigation.

For example, when an identifier of a web page associated with the first item and/or an identifier of the first item is received, systems and methods are described herein for identifying one or more additional items that are a same or similar item as the first item based on a similarity of content between the web page associated with the first item and web pages associated with the additional items. A notification indicating the identified additional item(s may then be generated and provided for display on the computing device. Therefore, rather than the consumer having to rely on a traditional search engine to independently search for different online merchants of the first item and compare item information, information associated with each of the identified additional items may be included in the notification to enable the consumer to make an informed decision when purchasing the item, and the information may further include a link to enable one-click navigation to the web pages of the identified additional items.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" may convey "based at least in part on." The singular forms "a," "an," and "the" may include plural referents unless the context dictates otherwise. The term "exemplary" may be used in the sense of "example" rather than "ideal." The terms "comprises," "comprising," "includes," "including," or other variations thereof, may convey a non-exclusive inclusion such that a process, method, or product that comprises a list of elements does not necessarily include only those elements, but may include other elements not expressly listed or inherent to such a process, method, article, or apparatus. The term "or" may be interpreted disjunctively, such that "at least one of A or B" includes, (A), (B), (A and A), (A and B), etc. Similarly, the term "or" is intended to mean "and/or," unless explicitly stated otherwise. "And/or" may convey all permutations, combinations, subcombinations, and individual instances of items or terms included within a list of the items or terms. Relative terms, such as, "substantially" and "generally," may be used to indicate a possible variation of ±10% of a stated or understood value.

Terms like "provider," "merchant," "vendor," or the like may generally encompass an entity or person involved in providing, selling, and/or renting items to persons such as a seller, dealer, renter, merchant, vendor, or the like, as well as an agent or intermediary of such an entity or person. An "item" may generally encompass a good, service, or the like having ownership or other rights that may be transferred. As used herein, terms like "consumer" or "user" may generally encompass any person or entity that may view and/or purchase items from a merchant online, and may consume item notification services from a provider (e.g., through an application with which the consumer or user has an associated account). The term "application" may be used interchangeably with other terms like "program," or the like, and generally encompasses software that is configured to interact with, modify, override, supplement, or operate in conjunction with other software.

As used herein, a "machine learning model" may generally encompass instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning model may generally be trained using training data, e.g., experiential data and/or samples of input data, which are fed into the model in order to establish, tune, or modify one or more aspects of the model, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, certain embodiments may enable generation of similar item notifications based on machine learning determinations of online item similarity. Web scraping may be performed to extract one or more images and/or text from each of a plurality of web pages for storage in a data store. Each web page may be a product page or item page associated with an item. In some examples, a computing device of a consumer may be executing a browser that is navigated to a first web page associated with a first item. In such examples, an identifier of the first web page may be received from a browser extension application executing on the computing device. One or more images and/or text may be extracted from the first web page and provided as input to a machine learning model along with one or more images and/or text from a second web page of the plurality of web pages received from the data store. The second web page may be associated with a second item, and the machine learning model may be trained to predict whether the first item and the second item are a same item. For example, the machine learning model may output a probability that the first item and second item are the same item.

If the probability is at or above a predefined threshold, a notification may be generated and provided to the browser extension application for display. The notification may indicate identification of the second item as the same item and include information associated with the second item. In some examples, consumer data, such as consumer interaction data, consumer preference data, and/or consumer account data, may be leveraged when generating the notification and information included therein to customize the notification to the consumer.

Regardless of whether the probability that the first item and second item are the same item is at or above the predefined threshold (causing the notification to be generated) or is below the predefined threshold, iterative machine learning determinations may be made to determine whether one or more other items are the same or similar to the first item. For example, images and/or text from a next web page associated with a next item (e.g., a third web page associated with a third item, fourth web page associated with a further item, and so on) may be received from the data store and provided with the images and/or text from the first web page as input to the machine learning model to determine whether the first item and the next item are the same item. If the probability output by the machine learning model is at or above the predefined threshold, the notification may be updated to include information associated with the next item. In some examples, the machine learning determinations may be performed for at least a subset of the plurality of web pages for which images and/or text are stored in the data store. To provide computational efficiencies, the data store may include a tree structure, such as a binary tree structure, and each next web page within the subset of web pages may be selected based on the tree structure.

In other examples, where the application executing on the computing device is a desktop application, mobile application, and/or web application, an identifier of the first web page, an image of the first item (e.g., from the first web page or an alternative source), and/or text associated with the first item (e.g., from the first web page or an alternative source) may be input to a search field of a user interface of the application to initiate the above-described similarity determination and notification generation process. Additionally or alternatively, the first web page may include a share functionality that, when selected by the consumer (e.g., via a selection of a share button or the like), prompts the consumer to select an application to share the first web page with. The consumer may select to share the first web page with the application, and the application may receive the identifier (e.g., the URL) of the first web page via the share functionality. In these other examples, the notification may be similarly generated based on the machine learning determination; however the notification may be provided for display on the computing device via the user interface of the application.

While the specific examples included throughout the present disclosure involve items that are available for viewing and/or purchasing online, it should be understood that techniques according to this disclosure may be adapted to determine a similarity and, if appropriate, generate an item similarity notification for any good or service that is made available for at least viewing online for which a user may desire to compare similar goods or services. It should also be understood that the examples above are illustrative only. The techniques and technologies of this disclosure may be adapted to any suitable activity.

Presented below are various aspects of machine learning techniques that may be adapted for determining whether two items (e.g., a pair of items) are a same item. As will be discussed in more detail below, the machine learning techniques may include one or more aspects according to this disclosure, e.g., a particular selection of training data, a particular training process for the machine learning system, operation of the machine learning system in conjunction with particular data, modification of such particular data by the machine learning system, etc., and/or other aspects that may be apparent to one of ordinary skill in the art based on this disclosure.

FIG. 1 depicts an exemplary environment 100 for determining similarity of online items, according to certain embodiments, and which may be used with the techniques presented herein. A computing device 102 may communicate with one or more of the other components of the environment 100 across electronic network 104, including one or more server-side systems 106 associated with a provider, discussed below. The computing device 102 may be associated with a user having an account and consuming one or more services of the provider, where at least one of the services is a similar item notification service. In some examples, the account may be a financial account provided by the provider or an account that is linked to or otherwise tied to a financial account that is provided by the provider.

The network 104 over which the one or more components of the environment 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" or "web page" generally encompasses a location, data store, or the like that is, for example, hosted and/or operated by a computer system so as to be accessible online, and that may include data configured to cause a program such as a browser to perform operations such as send, receive, or process data, generate a visual display and/or an interactive interface, or the like. An "online item" may include an item that may be viewed and/or interacted with (e.g., favorited, placed in a shopping cart, purchased, etc.) via a web page. The computing device 102 and one or more of the server-side systems 106 may be connected via the network 104, using one or more standard communication protocols. The computing device 102 and the one or more of the server-side systems 106 may transmit and receive communications from each other across the network 104, as discussed in more detail below.

The server-side systems 106 may include a web scraping system 108, an item similarity determination system 110, and/or a data storage system 112, among other systems. In some embodiments, the web scraping system 108, the item similarity determination system 110, and the data storage system 112 may be associated with a common entity, e.g., the provider, or the like. In such embodiments, the web scraping system 108, item similarity determination system 110, and/or data storage system 112 may be part of a cloud service computer system (e.g., in a data center). In other embodiments, one or more of the components of the environment 100 may be associated with a different entity than one another. For example, the web scraping system 108 may be associated with a third party that provides web scraping services to the provider and/or the data storage system 112 may be associated with a same or different third party that provides data storage services to the provider. The systems and devices of the environment 100 may communicate in any arrangement. As will be discussed herein, systems and/or devices of the environment 100 may communicate in order to enable generation of similar item notifications, among other activities.

The computing device 102 may be configured to enable the user to access and/or interact with other systems in the environment 100. For example, the computing device 102 may be a computer system such as, for example, a desktop computer, a laptop computer, a tablet, a smart cellular phone, a smart watch or other electronic wearable, etc. In some embodiments, the computing device 102 may include one or more electronic application(s), e.g., a program, plugin, browser extension, etc., installed on a memory of the computing device 102. In some embodiments, the electronic application(s) may be associated with one or more of the other components in the environment 100. For example, and as shown in FIG. 1, computing device 102 may include an application 114 that is configured to communicate with one or more of the server-side systems 106. In some examples, the application 114 may communicate with one or more components of the server-side systems 106 via an application programming interface (API). The application 114 may be executed on the computing device 102 to enable at least the similar item notification services of the provider. In some examples, the application 114 is a browser extension application that adds functionality, such as similar item notification functionality, to a browser launched on the computing device 102. As depicted in FIG. 1, a first web page 116 may be navigated to by the browser. The first web page 116 may be a web page associated with a first item and a first merchant (e.g., the first merchant's product page for the first item). The first web page 116 may include images and text associated with (e.g., describing) the first item. In other examples, the application 114 may be a thick client application that is installed locally on the computing device 102 (e.g., a desktop application or mobile application) or a thin client application (e.g., a web application) that is rendered via the browser launched on the computing device 102.

Additionally, one or more components of the computing device 102 may generate, or may cause to be generated, one or more graphic user interfaces (GUIs) based on instructions/information stored in the memory, instructions/information received from the other systems in the environment 100, and/or the like and may cause the GUIs to be displayed via a display of the computing device 102. The GUIs may be, e.g., browser user interfaces or application interfaces and may include text, input text boxes, selection controls, and/or the like. The display may include a touch screen or a display with other input systems (e.g., a mouse, keyboard, etc.) for the user of the computing device 102 to control the functions of the computing device 102.

The web scraping system 108 of the server-side systems 106 may include one or more server devices (or other similar computing devices) for executing web scraping to extract data from a plurality of web pages. Each web page may be a web page for an item (e.g., a product page for the item) that is associated with a merchant, for example. The data extracted from each web page may include image and/or text data, including tagged metadata of the images. For example, the web scraping system 108 may perform web scraping by directly accessing the Web using hypertext transfer protocol or a browser to fetch the web pages for processing. The access may be performed manually or automatically using a bot or web crawler, for example. Once, fetched the data may be extracted from the web pages. In some examples, the data may be parsed, searched, and/or reformatted for storage. The extracted data may be stored in a data store of the data storage system 112, as described in more detail below. In some examples, the web scraping system 108 may perform web scraping periodically (e.g., at periodic intervals). Additionally or alternatively, web scraping may be performed in response to a determination of a trigger event (e.g., a determination that web page data has changed, a determination that new web pages are available, a receipt of a manual request to perform web scraping, and/or other similar event).

The item similarity determination system 110 may include one or more server devices (or other similar computing devices) for executing similar item notification services. As described elsewhere herein, example similar item notification services may include determining whether there are one or more other online items that are the same or similar to an online item of interest to the user. In some examples, an online item of interest may be an item that is currently being viewed and/or interacted with by the user, such as the first item from the first web page 116 navigated to by the browser executing on the computing device 102. An identifier of the first web page 116 received by the item similarity determination system 110 from the application 114 may indicate the first item as the item of interest. In other examples, identifiers associated with the first item itself may be received and may indicate the first item as the online item of interest, as discussed in more detail below. A trained machine learning model may be deployed to perform the item similarity determination. In some examples, the machine learning model may be trained by the item similarity determination system 110 and stored in a data store of the item similarity determination system 110 (not shown) and/or the data storage system 112. In other examples, the machine learning model may be trained by a third party, and provided to the item similarity determination system 110 for storage and deployment.

Example similar item notification services may also include generating a notification that indicates the one or more other online items determined to be the same or similar to the online item of interest and includes information associated with each of the one or more other online items. The information may be previously extracted from associated web pages (e.g., extracted by the web scraping system 108 and stored in a data store of data storage system 112). At least a portion of the information included within the notification may be based on consumer data associated with the account of user that is obtained from one or more data stores of data storage system 112, described below. Additionally, if two or more other online elements are determined to be the same or similar, the two or more other online elements may be ranked and displayed within the notification in an order-based on the ranking.

The data storage system 112 may include a server system or computer-readable memory such as a hard drive, flash drive, disk, etc. In some embodiments, the data storage system 112 includes and/or interacts with an application programming interface for exchanging data to other systems, e.g., one or more of the other components of the environment, such as at least the web scraping system 108 and the item similarity determination system 110. The data storage system 112 may include and/or act as a repository or source for various types of data. For example, the data storage system 112 may include a plurality of data stores, including a web page data store 118, an account interaction data store 120, and/or an account profile data store 122, among other data stores.

The web page data store 118 may include the data (e.g., the images and/or text) extracted by the web scraping system 108 from each of the plurality of web pages associated with the plurality of items. For example, the web page data store 118 may include second web page data 124, third web page data 126, and so on. The data extracted from each web page may be stored in association with the web page from which they were extracted. The web page data store 118 may include a tree data structure, such as a binary tree. For example, each web page may be assigned to positions or nodes in the tree data structure based on properties of the images and/or text extracted from the respective web page. The properties of the images and/or text may be parsed from the website page data as part of the extraction.

The account interaction data store 120 may include consumer interaction data associated with the account. For example, if the account is a financial account or is linked to or otherwise tied to an accessible financial account (e.g., a financial account provided by the provider), the account interaction data store 120 may include past interactions (e.g., transactions) with merchants. The account profile data store 122 may include contact information for the user, including one or more physical mailing addresses of the user, contact preferences, and/or application notification preferences of the user, among other similar information. In some examples, the account interaction data store 120 and the account profile data store 122 may store the various types of account-related data in association with an identifier of the account.

Although depicted as separate components in FIG. 1, it should be understood that a component or portion of a component in the system of exemplary environment 100 may, in some embodiments, be integrated with or incorporated into one or more other components. For example, the web scraping system 108, the item similarity determination system 110, and/or data storage system 112 may be integrated or the like. In some embodiments, operations or aspects of one or more of the components discussed above may be distributed amongst one or more other components. Any suitable arrangement and/or integration of the various systems and devices of the exemplary environment 100 may be used.

In the following disclosure, various acts may be described as performed or executed by a component from FIG. 1, such as the computing device 102, one or more of the server-side systems 106, or components thereof. However, it should be understood that in various embodiments, various components of the exemplary environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
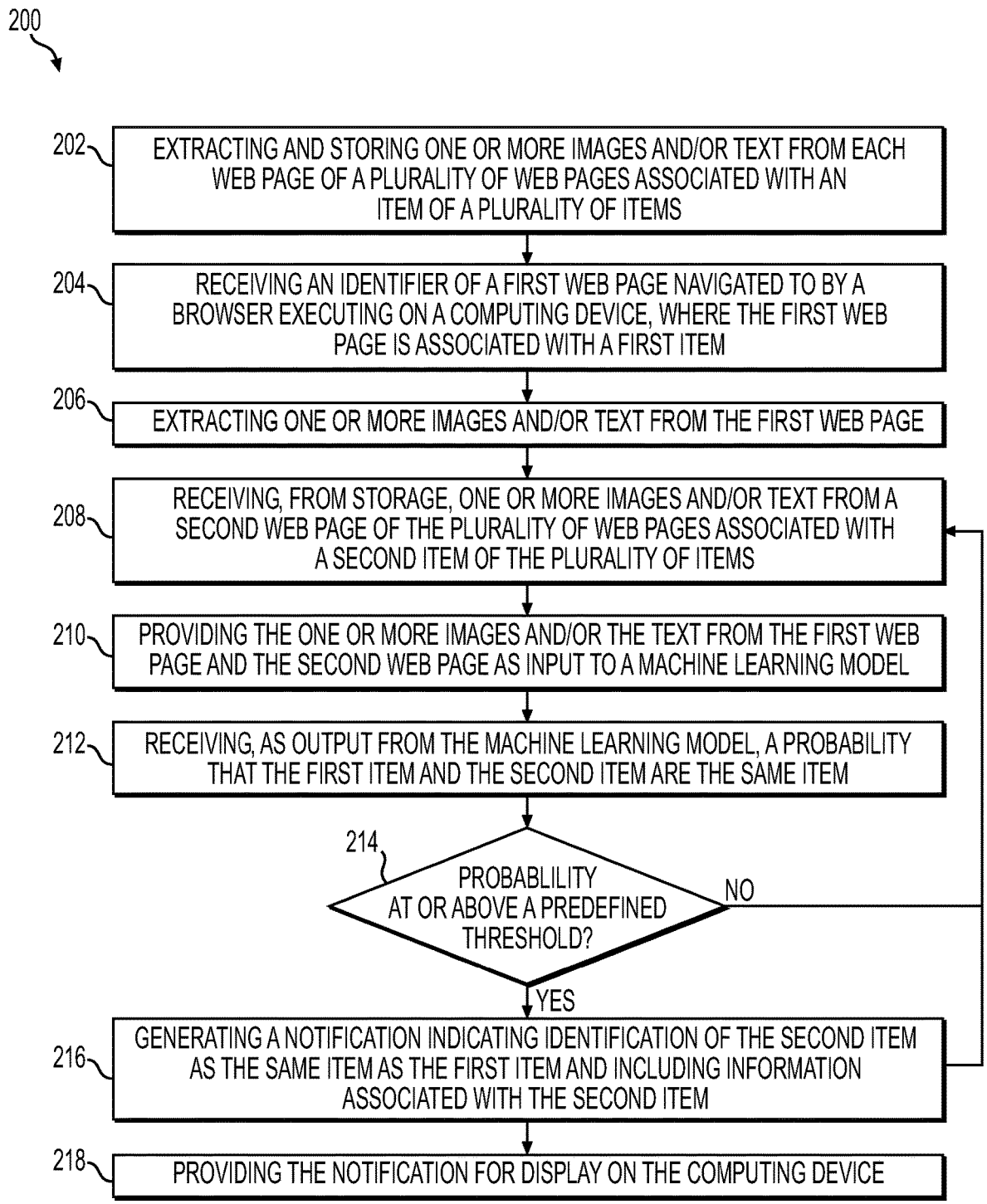
FIG. 2 depicts a flowchart of an exemplary process for determining similarity of online items, according to certain embodiments.

FIG. 2 depicts a flowchart of an exemplary process 200 for determining similarity of online items, according to certain embodiments. In some examples, the process 200 may be performed by the web scraping system 108 and/or the item similarity determination system 110.

At step 202, the process 200 may include extracting and storing one or more images and/or text from each web page of a plurality of web pages associated with an item of a plurality of items. The extracting may be performed by the web scraping system 108. As described above in detail with reference to FIG. 1, the web scraping system 108 may periodically perform web scraping and/or may perform web scraping in response to a determination of a trigger event. The extracted images and/or text may be stored in association with the respective web page in the web page data store 118. The web page data store 118 may include a tree structure for storing the images and/or text, which may provide computational processing efficiencies when iteratively performing item similarity determinations, as described in more detail below.

At step 204, the process 200 may include receiving an identifier of the first web page 116 navigated to by a browser executing on the computing device 102, where the first web page 116 may be associated with a first item. The identifier may be received from the application 114 executing on the computing device 102. In some examples, the identifier may be a uniform resource locator (URL) of the first web page 116. The identifier may be received by the web scraping system 108, and at step 206, the process 200 may include extracting one or more images and/or text from the first web page 116. For example, the web scraping system 108 may use the identifier to fetch the first web page 116. The web scraping system 108 may then parse content or data of the first web page 116 to extract the images and/or text from the first web page 116. In some examples, the images and/or text extracted from the first web page may be stored in the web page data store 118 in association with the identifier of the first web page. Additionally or alternatively, the application 114 may directly provide text and/or images from the first web page 116 to the item similarity determination system 110.

At step 208, the process 200 may include receiving, from storage, one or more images and/or text from a second web page of the plurality of web pages associated with a second item of the plurality of items. For example, the second web page data 124 may be received from the web page data store 118.

At step 210, the process 200 may include providing the one or more images and/or text from the first web page 116 and the second web page as input to a machine learning model. The machine learning model may be trained to predict whether the first item and the second item are a same item, as described in more detail with reference to FIG. 3 below.

In some examples, the images and/or text from each web page may be vectorized to generate a plurality of vectors, and the vectors may be provided as the input to the machine learning model. The vectors may include at least a vector for each of the one or more images and/or a vector for the text from the first web page 116, and a vector for each of the one or more images and/or a vector for the text from the second web page. For example, pixels of the images may be transformed into feature vectors using image processing techniques, such as feature extraction and/or edge detection techniques. Exemplary and non-limiting image processing techniques that may be implemented include feature mapping using a scale-invariant feature transform (SIFT) algorithm and/or image registration using a random sample consensus (RANSAC) algorithm. Similarly, the text may be transformed into vectors using a Bidirectional Encoder Representations from Transformers (BERT) model, binary term frequency, bag of words (BOW) term frequency, (L1) normalized term frequency, (L2) normalized term frequency-inverse document frequency (TF-IDF), and/or Word2Vec, among other similar examples. In some examples, particular words (e.g., keywords) may be identified from the text, where the keywords may be given more weight within the machine learning model. The keywords may be words that appear with a low frequency in the web page. Additionally or alternatively, the keywords may be identified based on location of the keywords within (e.g., a structure of) the web page. For example, words from a heading of the web page may be identified as a keywords as the heading often includes a name of the respective item associated with the web page, among other more important descriptors, such as a name of a manufacturer of the respective item.

At step 212, the process 200 may include receiving, as output from the machine learning model, a probability that the first item and the second item are the same item. In some examples, a confidence level associated with the probability is received as further output from the machine learning model. The confidence level may be a standard deviation of the probability distribution, for example.

At step 214, the process 200 may include a decision or determination step of whether the probability that the first item and the second item are the same item is at or above a predefined threshold. In instances where the confidence level is also output by the machine learning model, the predefined threshold may also include a particular range of standard deviation (e.g., a range indicating a strong confidence). As an illustrative, non-limiting example, the predefined threshold may be a 95% likelihood that the two items are the same item with a standard deviation within the particular range indicating a strong confidence.

If the decision or determination at step 214 is that the probability and/or confidence level is not at or above the predefined threshold (e.g., is below the predefined threshold), the process 200 returns to step 208 where one or more images and/or text from a next web page, such as the third web page associated with the third item, may be received from the web page data store 118. For example, the images and/or text included within the third web page data 126 may be received from the web page data store 118 and provided as input to the machine learning model along with the images and/or text from the first web page 116 to determine whether the first item and the third item are the same item (e.g., by performing steps 210, 212, and 214). The next web page may be selected to be received and input to the machine learning model based on the tree structure of the data store, described in more detail below.

Alternatively, if the decision or determination at step 214 is that the probability and/or confidence level that the first item and the second item are the same item is at or above the predefined threshold, the process 200 proceeds to step 216. At step 216, the process 200 may include generating a notification indicating identification of the second item as the same item as the first item and including information associated with the second item. In some examples, the notification may include the probability and/or confidence level output by the machine learning model that the first item and the second item are the same item. Additionally, the information within the notification may include or may at least be based on the images and/or the text from the second web page data 124. For example, the information may include a name of the second item, a manufacturer of the second item, an image of the second item, a description of the second item (including available colors and/or dimensions of the second item, if applicable), a review of the second item, a price of the second item, an estimated shipping cost associated with the second item, an estimated time of delivery of the second item, a merchant associated with the second web page, an offer associated with the second item or the merchant, and/or a navigation link to the second web page.

Further, in some examples, at least a portion of the information may be based on consumer data associated with the user's account. That is, at least a portion of the information may be altered or customized for the user based on the consumer data. The consumer data may include consumer interaction data, consumer location, and/or consumer preference data obtained from the account interaction data store 120 and/or the account profile store 122.

The consumer interaction data may include previous interactions (e.g., past transactions) with various merchants received from the account interaction data store 120. From the consumer interaction data, preferred merchants, including merchants most frequently interacted with and/or merchants most recently interacted with by the user, may be identified. Additionally, from the consumer interaction data, indications of user subscriptions may be identified (e.g., based on recurring monthly payments to a same merchant). If the user has a subscription for the merchant associated with the second web page for the second item, information within the notification, such as the price of the second item, the estimated shipping cost and/or the estimated time of delivery, may be altered to reflect any discounts or benefits received as a result of the subscription. The consumer location received from the account profile store 122 may include the user's mailing or shipping address. The consumer location may be used to provide a more accurate estimated shipping cost and/or estimated time of delivery. The consumer preference data received from the account profile store 122 may include user preferences with respect to what types of information are important to or want to be seen by the user within the notification to enable the notification to be customized to the user.

Additionally, in some examples, consumer data associated with other accounts (e.g., accounts of other users different than the user) may be received from the account interaction data store 120 and used to further customize the information provided within the notification. For example, based on the consumer data of the other accounts, the merchant associated with the second item (e.g., a second merchant) may be identified as a merchant interacted with by a number of these other users who also recently interacted with a most frequent or recent merchant that the user interacted with (e.g., the user's preferred merchant). The notification may include a statement indicating that other users who interact with the user's preferred merchant have also interacted with the second merchant to, for example, increase the user's confidence in interacting with the second merchant. In some examples, the other accounts for which the consumer data is received may include accounts having similar features or characteristics to the account of the user.

After step 214, the process 200 may return to step 208 where one or more images and/or text from a next web page, such as the third web page associated with the third item, may be received from storage. For example, the images and/or text from the third web page data 126 may be received from the web page data store 118 and provided as input to the machine learning model along with the images and/or text from the first web page 116 to determine a probability that the first item and the third item are the same item (e.g., by performing steps 210, 212, and 214).

If the probability that the first item and third item are the same item is below the threshold, the process may return to step 208 where one or more images and/or text from a next web page associated with a next item may be received from the web page data store 118 and provided along with the images and/or text from the first web page 116 as input to the machine learning model to determine a probability that the first item and the next item are the same item (e.g., by performing steps 210, 212, and 214).

Alternatively, if the probability that the first item and third item are the same item is at or above the threshold, the notification may be updated to also indicate identification of the third item as the same item as the first item and include information associated with the third item. In some examples, the notification may include the probability and/or confidence level output by the machine learning model that the first item and the third item are the same item. Additionally, the information within the notification may include or at least may be based on the images and/or the text from the third web page data 126. For example, the information included in the notification may include a name of the third item, a manufacturer of the third item, an image of the third item, a description of the third item (including available colors and/or dimensions of the third item, if applicable), a review of the third item, a price of the third item, an estimated shipping cost associated with the third item, an estimated time of delivery of the third item, a merchant associated with the third web page, an offer associated with the third item or the merchant, and/or a navigation link to the third web page.

Additionally, in some examples, the second item and the third item may be ranked based on their respective probability that the first item and the second item are the same item and the first item and the third item are the same item. For example, if the second item has a 97% probability of being the same item as the first item, and the third item has a 98% probability of being the same item as the first item, the third item may be ranked higher than the second item. The ranking may further be based on the consumer data associated with the user's account, including consumer interaction data, consumer location, and/or consumer preference data received from the account interaction data store 120 and/or the account profile data store 122. For example, even if the third item has a greater probability of being the same item as the first item, if based on the consumer interaction data, the second item is associated with a preferred merchant that the user has interacted more often and/or more recently with than another merchant with which the third item is associated with, the second item may nonetheless be ranked higher. As another example, if utilizing the customer location, it is determined that the second item has lower estimated shipping costs and/or faster estimated delivery time than the third item, the second item may nonetheless be ranked higher than the third item. The information associated with second item and the third item may then be ordered within the notification based on the ranking. For example, the information associated with item having the higher ranking may be displayed above or otherwise more prominently than the information associated with the second item within the notification.

In some examples, the first web page and first item may be associated with a first merchant, the second web page and second item may be associated with a second merchant, and the third first page and the third item may be associated with a third merchant. Each of the first, second, and third merchants may be a different merchant from one another. For example, each of the first merchant, the second merchant, and the third merchant may sell a same item (e.g., the first item, the second item, and the third item) produced by a same manufacturer. By determining that the second item and the third item are the same item as the first item and generating the notification to indicate the determination and information associated with each item as described above, the user may be provided with alternative options from the first merchant for purchasing the item of interest. For example, the user may be able to select to purchase the item from one of the first, second, or third merchant that may provide a best deal to the user, where the best deal may encompass price, shipping cost, and/or offers or discounts (e.g., subscription-based or otherwise), as well as other aspects like delivery time frame or availability of particular colors and/or dimensions associated with the item.

In further examples, upon the user receiving the notification comprising, e.g., the second and third items, as well as any additional items, determined to be the same or similar to the first item, user interactions with the notification may be monitored. Based on the user interactions, the items and their associated information may be rearranged within the notification to correspond to an updated ranking for each item. As one example, based on consumer data associated with the user's account, it may be determined that lowest price is typically a driving factor for consumer purchase, and thus the items may initially be ranked and ordered for display within the notification from lowest price to highest price. However, if based on user interactions with the notification, the user selects to view more details and/or selects the navigation link to a web page associated with one or more of the items that have an earliest delivery time frame rather than lowest price (e.g., indicating that, for at least this item, speed of delivery may surpass price as a driving factor), the ranking for the items may be updated to more heavily weight delivery time frame. A new notification may be generated and displayed that automatically rearranges the items in the new notification to correspond to the updated ranking.

Steps 208-214 and/or 208-216 of the process 200 may be iteratively performed for the images and/or text from each next page web page of at least a subset of the plurality of web pages scraped and stored in the web page data store 118. In some examples, each next web page of the subset may be selected based on the tree structure.

As previously discussed with reference to FIG. 1, web page data, including the images and/or text, extracted from each scraped web page may be assigned to positions or nodes in the tree data structure based on properties of the images and/or text. Nodes assigned to web page data of scraped web pages having more similar image and/or text properties are positioned closer to one another within the tree data structure than other web page data of scraped web pages having less similar image and/or text properties. Therefore, the tree structure may be utilized in conjunction with an outcome from a previous probability determination (e.g., at step 214) to select the next web page. For example, if the second web page data 124 is assigned to a first node and the second item associated with the second web page is determined to be the same item as the first item at step 214, the next web page selected may be a web page having web page data assigned to a second node adjacent to the first node. For illustrative purposes, the next web page may be the third web page associated with the third item, where the third web page data is assigned to the second node. The adjacency of the first node to the second node may indicate the extracted images and/or text of the third web page data 126 associated with the third item have similar properties to the images and/or text of the second web page data 124 associated with the second item, and thus the third item is likely to be the same or similar to the second item. Because the second item was determined to be the same item as the first item, selection of the third web page as the next web page to be run by the machine learning model increases a likelihood that the third item may also be determined to be the same item as the first item.

In contrast, if the second item is determined not to be the same item as the first item at step 214, the next web page selected may be a web page having web page data, including extracted images and/or text, assigned to a third node more distant from the first node (e.g., than the second node) within the tree structure. The greater distance between the first node and the third node indicates properties of the images and/or text of the web page data assigned to the third node and properties of the images and/or text of the second web page data 124 have a larger number of differences among them, and thus the item associated with the next page is likely to be different than the second item (and potentially the same as the first item).

Utilizing the tree structure described above provides computational processing efficiencies over a linear list structure. For example, if a linear list structure was utilized, the images and/or text from each and every web page of the plurality of web pages that have been scraped by the web scraping system 108 may be provided along with the images and/or text of the first web page 116 to the machine learning model to run a similarity determination. Resultantly, an exceedingly large number of similarity determinations would be run, which is computationally cumbersome. Instead, by utilizing the tree structure to store the web page data scraped from the plurality of web pages according to properties of the web page data, only a subset of the plurality of web pages may be selected that are most likely to be web pages for items that are the same or similar to the first item (e.g., based on the previous probability determination).

After steps 208-214 and/or 208-216 are performed with respect to the images and/or text from each of the subset of the plurality of web pages to determine whether the respective items associated with the subset of web pages are the same item as the first item, process 200 may proceed to step 218. At step 218, the process 200 may include providing the notification for display on the computing device 102. The notification may be provided to the application 114 to enable the display of the notification on the computing device 102. In some examples, the notification may be displayed as an interactive pop-up notification within the browser navigated to the first web page 116 that is executing on the computing device 102. To provide one illustrative example, the notification, when initially displayed, may include visual, animation, and/or sound elements to draw the user's attention to the notification and may include at least the indication that item(s) from other merchants that are the same or similar to the first item have been identified. In some examples, the initial notification may include a prompt for the user to interact with an element of the initial pop-up notification to view more details. For example, the element may be a drop-down element that may be clicked on and/or tapped by the user to cause the information associated with the item(s) determined to be the same or similar to the first item to be displayed in a drop-down menu or other similar display format (e.g., the notification may be expanded). An exemplary expanded notification is shown in and described with reference to FIG. 4 below.

As previously discussed one type of information that may be included within the information associated with the item(s) is a navigation link to the web page of the merchant. For example, for the second item, a navigation link to the second web page of the second merchant may be including within the notification. Upon the user selecting the navigation link to the second web page from within the notification, the browser may then navigate to the second web page in a new tab of the browser, for example.

In some instances, the user may purchase the first item or one of the other item(s) determined to be the same or similar to the first item via a respective website. For example, the user may purchase the first item via a checkout process facilitated by the first web page 116 (or another associated web page of the first merchant) and/or the user may purchase the second item via a checkout process facilitated by the second web page (or another associated web page of the second merchant).

In some examples, in addition to providing the similar item notification services, the provider may provide retroactive price alert services. For example, if the user purchases the first item from the first merchant, and subsequently the first item from the first merchant drops in price and/or the second item (determined to be the same item as the second item) from the second merchant drops in price, the provider may generate and transmit a price alert notification to the computing device 102 or another computing device of the user. The price alert notification may indicate the item purchased, the price the item was purchased for, and a merchant from which the item was purchased. The price alert notification may also include information on the item price drop. In some examples, the price alert notification may include a selectable option to return the purchased item, which may initiate a return process, cancel the order if the purchased item is not yet received, and/or purchase the item associated with the price drop. In other examples, the price alert notification may allow the user to request from the merchant from which the item was purchased, a price difference from the price paid and the price following the price drop. The price alert notification may be an electronic communication, such as an electronic mail (e-mail), a text message, an instant message, a push notification, and/or a notification via an application, where the application may be the application 114 or a different application associated with the provider.

While the notification is described herein as being generated by the item similarity determination system 110 and transmitted to the application 114 for display on the computing device 102, in other examples, the item similarity determination system 110 may generate and send instructions, including the information to be included in the notification, to the application 114 for processing by the application 114 to generate and display the notification.

Accordingly, certain embodiments may perform a determination of online item similarity. The process 200 described above is provided merely as an example, and may include additional, fewer, different, or differently arranged steps than depicted in FIG. 2.

The above process 200 is an example process for determining similarity of online items when the application 114 is a browser extension application. In other examples, the application 114 may be a desktop or mobile application and/or a web application. In such examples, the manner in which an indication of the first item is received and/or the notification is provided for display may differ from the process 200 (e.g., steps 202, 204 and/or 218 may differ). For example, when the application 114 is a desktop or mobile application and/or a web application, a user interface of the application 114 may include a similar item search field. In some examples, the user may copy and paste the identifier (e.g., the URL) of the first web page 116 into the search field of the application 114 and select to execute the search. Resultantly, the web scraping system 108 and/or item similarity determination system 110 may receive the identifier of the first web page 116 from the application 114 over the network 104 and may perform steps 206 through 218. In addition to or instead of the identifier of the first web page 116, the user may copy one or more images and/or text associated with the first item from the first web page 116 or an alternative source and paste the image(s) and/or text into the search field. In some examples, the images may be screenshots captured by the computing device 102 or another computing device of the user from the first web page 116 or another source such as an application page.

Additionally or alternatively, the first web page 116 may include a share functionality that, when selected by the user (e.g., via a selection of a share button or the like), prompts the user to select an application to share the first web page 116 with. The user may select to share the first web page 116 with the application 114, and the application 114 may receive the identifier (e.g., the URL) of the first web page 116 via the share functionality.

When the application 114 is a desktop or mobile application and/or a web application, the notification generated may be provided for display on the computing device 102 via an interface of the application 114. In some examples, the notification may be provided as a separate page of the application 114. In other examples, the notification may be provided as a menu or other similar graphical display element on a same page of the application as the search field.

Figure 3:
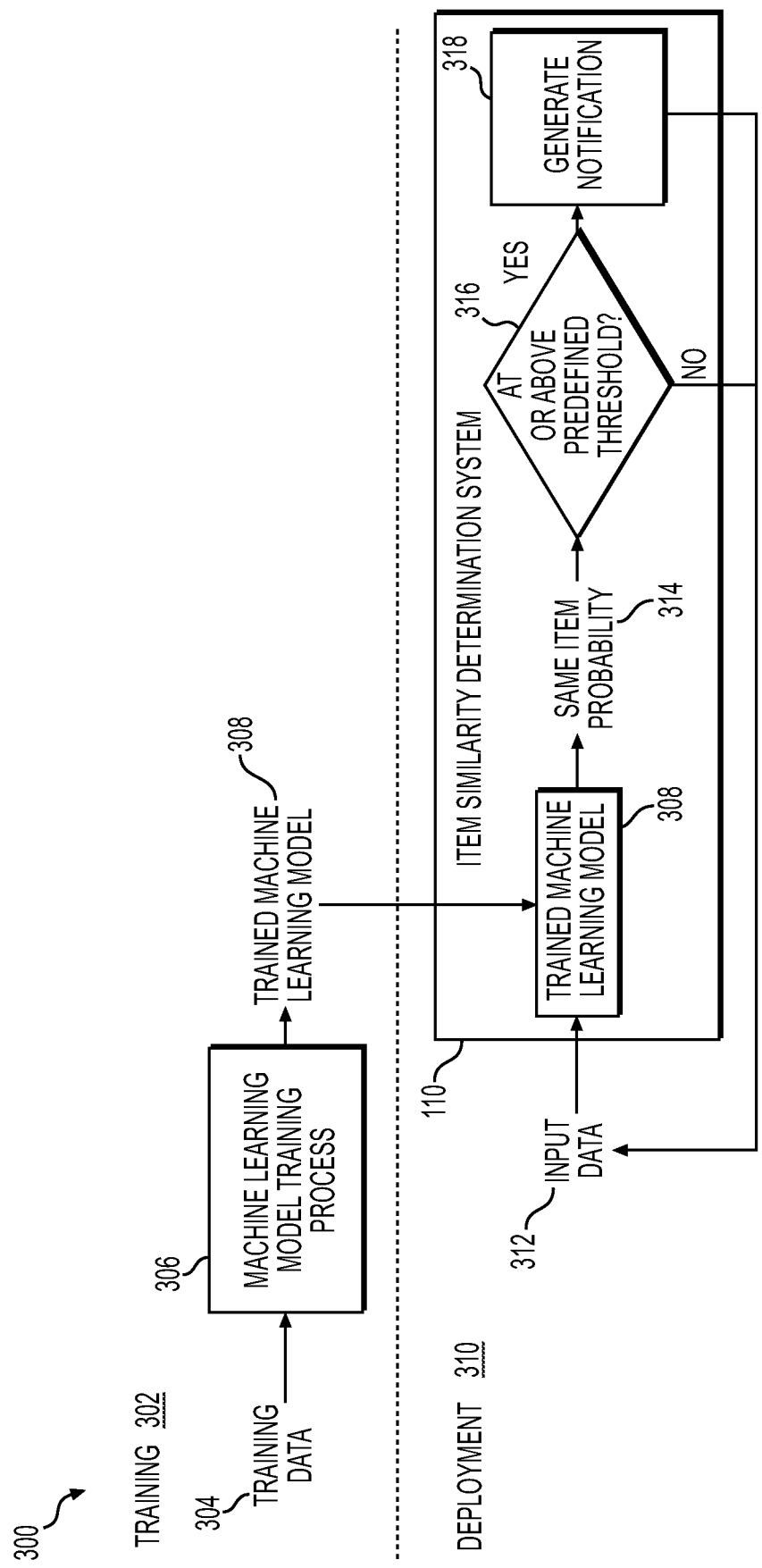
FIG. 3 depicts a block diagram of an exemplary process for training and using a machine learning model to determine similarity of online items, according to certain embodiments.

FIG. 3 depicts a block diagram of an exemplary process 300 for training and using a machine learning model to determine similarity of online items, according to certain embodiments. In some embodiments, the item similarity determination system 110 may one or more of generate, store, train, or use a machine learning model configured to predict whether two items (e.g., a pair of items) are a same item. The item similarity determination system 110 may include a machine learning model and/or instructions associated with the machine learning model, e.g., instructions for generating a machine learning model, training the machine learning model, using the machine learning model, etc. In other embodiments, a system or device other than the item similarity determination system 110 may be used to generate and/or train the machine learning model. For example, such a system may include instructions for generating the machine learning model and the training data, and/or instructions for training the machine learning model. A resulting trained-machine learning model may then be provided to the item similarity determination system 110 for use.

As depicted in FIG. 3, in some examples, the process 300 may include a training phase 302 and a deployment phase 310. In the training phase 302, at step 306, the process 300 may include receiving and processing training data 304 to build a trained machine learning model 308 for predicting whether a pair of items, such as the first item and the second item or the first item and the third item, described above with reference to FIG. 2, are a same item.

The training data 304 may include a plurality of training sets. Each training set may include two subsets of images and/or text, where each subset is associated with one item of a pair of items to train the machine learning model to predict whether the pair of items are a same item. For example, the training set may include a first subset of images and/or text for a first item of the pair and a second subset of images and/or text for a second item of the pair. In some examples, when supervised and/or semi-supervised learning processes are used, one or more of the plurality of training sets may be associated with a corresponding label that indicates whether the pair of items are a same item, as described in more detail below. The training data 304 may be generated, received, or otherwise obtained from internal and/or external resources. For example, a subset of images and/or text for a training set may be collected from a web page for the respective item (e.g., a web page of a merchant through which the user may view and/or purchase the item from the merchant) by web scraping performed by the web scraping system 108. Additionally or alternatively, the training sets may be collected from other sources including a combination of images and/or text associated with online items. In some examples, the images within the training sets may be pixel-shifted from cropping or may capture the item from different angles to improve an ability of the machine learning model to process images when making the item similarity determination.

Generally, a model includes a set of variables, e.g., nodes, neurons, filters, etc., that are tuned, e.g., weighted or biased, to different values via the application of the training data 304. In some examples, the training process at step 306 may employ supervised, unsupervised, and/or semi-supervised learning processes to train the model (e.g., to result in trained machine learning model 308). In some embodiments, a portion of the training data 304 may be withheld during training and/or used to validate the trained machine learning model 308.

When supervised learning processes are employed, labels or scores corresponding to the training data 304 may facilitate the learning process by providing a ground truth. For example, the labels or scores may indicate whether the pair of items are a same item. Training may proceed by feeding a sample from the training data into the model, the model having variables set at initialized values, e.g., at random, based on Gaussian noise, a pre-trained model, or the like. The model may output a predicted probability that the pair of items are the same item for the sample. The output may be compared with the corresponding label or score (e.g., the ground truth) to determine an error, which may then be back-propagated through the model to adjust the values of the variables. This process may be repeated for a plurality of samples at least until a determined loss or error is below a predefined threshold. In some examples, some of the training data 304 may be withheld and used to further validate or test the trained machine learning model 308.

For unsupervised learning processes, the training data 304 may not include pre-assigned labels or scores to aid the learning process. Rather, unsupervised learning processes may include clustering, classification, or the like to identify naturally occurring patterns in the training data 304. K-means clustering or K-Nearest Neighbors may also be used, which may be supervised or unsupervised. Combinations of K-Nearest Neighbors and an unsupervised cluster technique may also be used. For semi-supervised learning, a combination of training data 304 with pre-assigned labels or scores and training data 304 without pre-assigned labels or scores may be used to train the model.

In some examples, the trained machine learning model 308 may be retrained periodically. For example, at periodic intervals (e.g., daily, weekly, etc.), additional and/or updated training data 304 may be collected that is received and processed at step 306 to update the trained machine learning model 308.

Once trained, the trained machine learning model 308 may be stored and subsequently applied by the item similarity determination system 110 during the deployment phase 310. For example, during the deployment phase 310, the trained machine learning model 308 executed by the item similarity determination system 110 may receive input data 312. The input data 312 may include images and/or text that have been extracted from respective web pages each associated with an item from a pair of items. A first item of the pair may be associated with a web page that is being viewed and/or interacted with by the user. For example, the first item of the pair may be the first item associated with the first web page 116 that is navigated to by the browser executing on the computing device 102. A second item of the pair may be associated with a web page from which data, including images and/or text, was extracted and stored in the web page data store 118 (e.g., by web scraping system 108) for subsequent retrieval and provision as the input data 312. For example, the second item of the pair may be the second item associated with the second web page. The trained machine learning model 308 may output a predicted probability that the first item and the second item of the pair of items are the same item (e.g., same item probability 314).

The same item probability 314 may be compared to a predefined threshold at decision process 316. If the same item probability 314 is determined to be at or above the predefined threshold at decision process 316, a notification may be generated at process 318. Additionally, regardless of whether the same item probability 314 is determined to be at or above the predefined threshold at decision process 316, the input data 312 associated with a next pair of items (e.g., the first item and a third item) may be provided to the item similarity determination system 110 for processing by the trained machine learning model 308. This process may be iteratively repeated for further pairs of items (e.g., the first item and a fourth item, the first item and a fifth item, and so on) to determine additional items that may be the same or similar to the first item. The notification may be updated with any additional items determined to be the same item as the first item, and the notification may then be provided for display on the computing device 102 (not shown in FIG. 3).

The example process 300 described above is provided merely as an example, and may include additional, fewer, different, or differently arranged aspects than depicted in FIG. 3.

Figure 4:
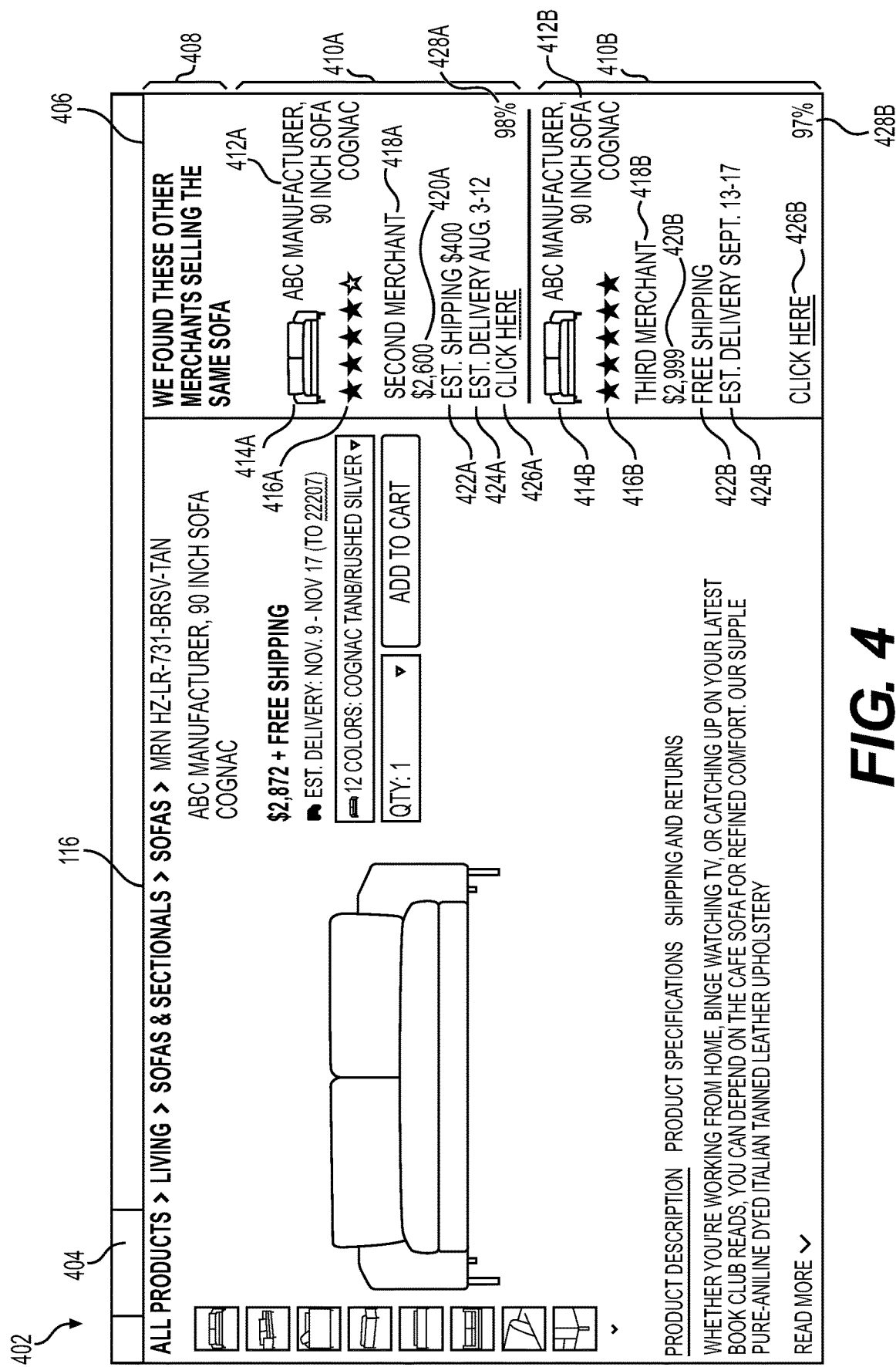
FIG. 4 depicts an exemplary notification, according to certain embodiments.

FIG. 4 depicts an exemplary notification 406, according to certain embodiments. The notification 406 may be received from the item similarity determination system 110 via the application 114 and displayed via a user interface of a browser (e.g., browser user interface 402) executing on the computing device 102. For example, the application 114 may be a browser extension application that adds functionality, such as similar item notification functionality, to the browser executing on the computing device 102. The browser may be navigated to the first web page 116 on a first browser tab 404, as shown in browser user interface 402. The first web page 116 may be an item or product page of the first merchant for an item, such as a sofa. Using the trained machine learning model 308, the item similarity determination system 110 may identify at least two other items associated with different merchants than the first merchant as being the same item as the sofa.

The notification 406 may include an indication 408 that the same sofa has been identified as being available for viewing and/or purchase via one or more other merchants. The notification 406 may also include information 410A, 410B associated with each of the same sofas identified. For example, for each of the same sofas identified, the following may be displayed within the notification 406: a description 412A, 412B (e.g., including a name, a manufacturer, color, and/or dimensions of the sofa), an image 414A, 414B, a review 416A, 416B, an associated merchant 418A, 418B, a price 420A, 420B, an estimated shipping cost 422A, 422B, an estimated time of delivery 424A, 424B, and/or a navigation link 426A, 426B to an item or product page for the sofa associated with the other merchant. Additionally, the notification 406 may include a probability 428A, 428B that each sofa is the same sofa associated with the first web page 116. The probability 428A, 428B may be the probability output by the trained machine learning model 308. In some examples, a confidence level associated with the probability that is also output by the trained machine learning model may be included with the probability in the notification 406.

The notification 406 may also include one or more control elements (e.g., links, buttons, check boxes, radio buttons, etc.) for causing an action to be performed, and information describing the control elements and/or requesting that the user make a selection of one or more of the control elements. For example, upon selection of one of the navigation links 426A, 426B, the application 114 may cause the browser to open a second browser tab different than the first browser tab 404, and the browse may navigate to and display the respective web page (e.g., the item or product page) for the sofa associated with the other merchant on the second browser tab within the browser user interface 402.

The notification 406 described above is provided merely as an example, and may include additional, fewer, different, or differently arranged information and/or interactive control elements than depicted in FIG. 4.

In general, any process or operation discussed in this disclosure that is understood to be computer-implementable, such as the processes or operations depicted in FIGS. 2-4, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 5:
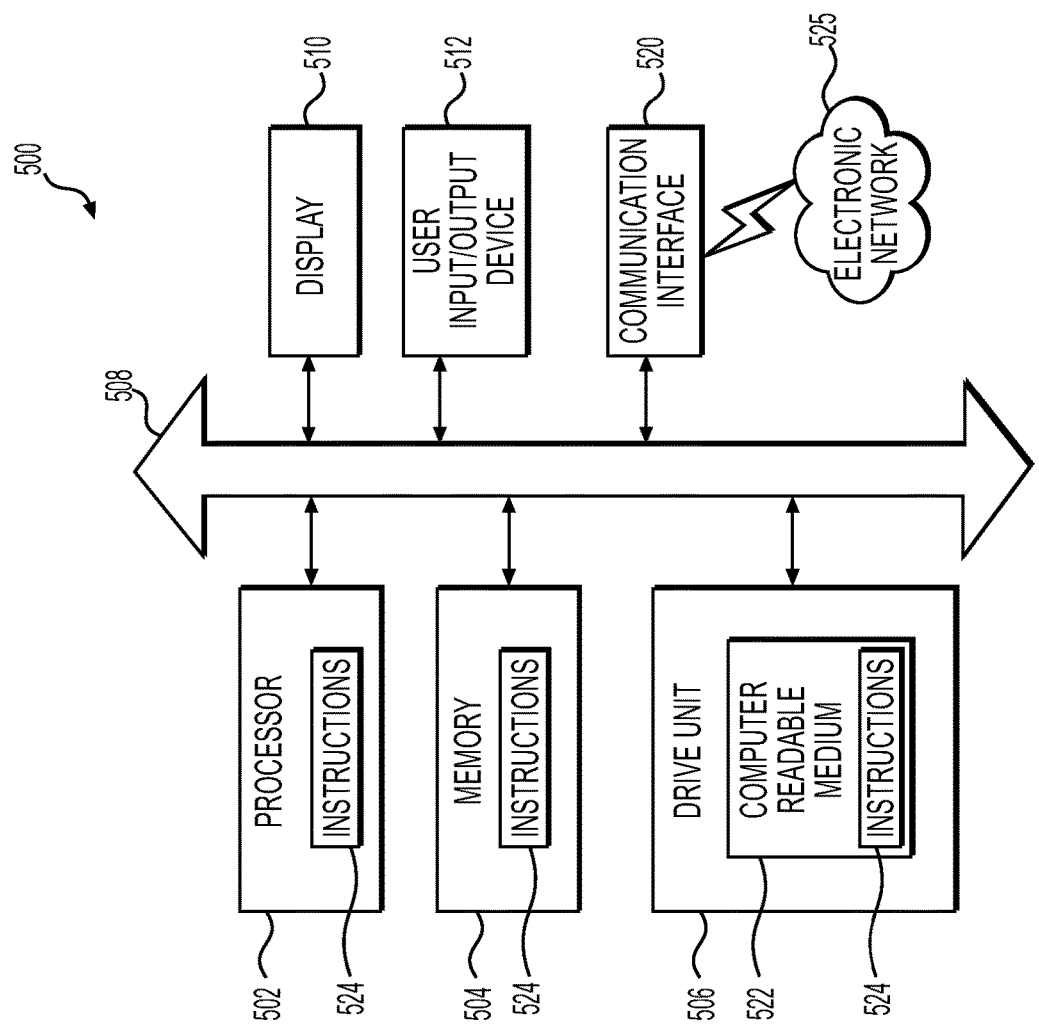
FIG. 5 depicts an example of a computer, according to certain embodiments.

FIG. 5 depicts an example of a computer 500, according to certain embodiments. FIG. 5 is a simplified functional block diagram of a computer 500 that may be configured as a device for executing processes or operations depicted in, or described with respect to, FIGS. 2-4, according to exemplary embodiments of the present disclosure. For example, the computer 500 may be configured as one of the computing device 102, one of the server-side systems 106, and/or another device according to exemplary embodiments of this disclosure. In various embodiments, any of the systems herein may be a computer 500 including, e.g., a data communication interface 520 for packet data communication. The computer 500 may communicate with one or more other computers 500 using the electronic network 525. The electronic network 525 may include a wired or wireless network similar to the network 104 depicted in FIG. 1.

The computer 500 also may include a central processing unit ("CPU"), in the form of one or more processors 502, for executing program instructions 524. The program instructions 524 may include instructions for running the application 114 (e.g., if the computer 500 is the computing device 102). The program instructions 524 may include instructions for running one or more operation of the server-side systems 106 (e.g., if the computer 500 is a server device or other similar computing device of one or more of the respective server-side systems 106). The computer 500 may include an internal communication bus 508, and a drive unit 506 (such as read-only memory (ROM), hard disk drive (HDD), solid-state disk drive (SDD), etc.) that may store data on a computer readable medium 522, although the computer 500 may receive programming and data via network communications. The computer 500 may also have a memory 504 (such as random access memory (RAM)) storing instructions 524 for executing techniques presented herein, although the instructions 524 may be stored temporarily or permanently within other modules of computer 500 (e.g., processor 502 and/or computer readable medium 522). The computer 500 also may include user input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning models for determining similarity of online items, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for determining similarity of online items, comprising:
    extracting and storing, in a data store, one or more images and text from each web page of a plurality of web pages associated with an item of a plurality of items, wherein the one or more images and text from each web page are stored relative to one another according to a data structure;
    receiving, from a browser extension application executing on a computing device, an identifier of a first web page navigated to by a browser executing on the computing device, wherein the first web page is associated with a first item;
    extracting one or more images and text from the first web page;
    receiving, from the data store, one or more images and text from a second web page of the plurality of web pages associated with a second item of the plurality of items;
    providing the one or more images and the text from the first web page and the one or more images and the text from the second web page as input to a machine learning model trained to predict whether the first item and the second item are a same item;
    receiving, as output from the machine learning model, a probability at or above a predefined threshold that the first item and the second item are the same item;
    generating a notification indicating identification of the second item as the same item as the first item and including information associated with the second item;
    selecting, from the plurality of web pages, a third web page associated with a third item from the plurality of items for which one or more images and text of the third web page are provided as input to the machine learning model along with the one or more images and the text from the first web page to predict whether the first item and the third item are a same item, wherein:
        the selection is based on a position of the third web page relative to the second web page within the data structure and the prediction that the first item and the second item are the same item, and
        the notification is updated to indicate identification of the third item as the same item as the first item and including information associated with the third item if when the first item and the third item are predicted to be the same item; and
    providing the notification to the browser extension application for display on the computing device.

2. The method of claim 1, wherein providing the one or more images and the text from the first web page and the one or more images and the text from the second web page as input to the machine learning model comprises:
   generating a plurality of vectors, including a vector for each of the one or more images from the first web page, a vector for the text from the first web page, a vector for each of the one or more images from the second web page, and a vector for the text from the second web page; and
   providing the plurality of vectors as the input to the machine learning model.

3. The method of claim 1, wherein the extracting and storing of the one or more images and the text from each web page of the plurality of web pages comprises performing web scraping.

4. The method of claim 1, further comprising:
   receiving, as further output from the machine learning model, a confidence level associated with the probability, wherein the probability and the confidence level are at or above the predefined threshold.

5. The method of claim 1, wherein at least a portion of the information in the notification includes or is based on at least one of the one or more images from the second web page or the text from the second web page.

6. The method of claim 1, further comprising:
   receiving consumer data associated with an account of the browser extension application, wherein at least a portion of the information associated with the second item in the notification is customized based on the consumer data.

7. The method of claim 6, wherein the consumer data includes one or more of consumer location, consumer preference data, or consumer interaction data.

8. The method of claim 1, wherein the information associated with the second item included in the notification comprises at least one of: the probability that the first item and the second item are the same item, a confidence level associated with the probability, a name of the second item, a manufacturer of the second item, an image of the second item, a description of the second item, a review of the second item, a price of the second item, an estimated shipping cost associated with the second item, an estimated time of delivery of the second item, a merchant associated with the second web page, an offer associated with the second item or the merchant, or a navigation link to the second web page.

9. The method of claim 1, wherein the data structure comprises a binary tree structure.

10. The method of claim 1, wherein when the first item and the third item are predicted to be the same item, the notification is updated to further indicate identification of the third item as the same item as the first item and further include information associated with the third item.

11. The method of claim 10, further comprising:
    ranking the second item and the third item based on the probability that the first item and the second item are the same item and the probability that the first item and the third item are the same item; and
    ordering the information associated with second item and the third item within the notification based on the ranking.

12. The method of claim 11, wherein the ranking is further based on consumer data associated with an account of the browser extension application, the consumer data including one or more of consumer location, consumer preference data, or consumer interaction data.

13. A system, the system comprising:
    at least one memory storing instructions; and
    at least one processor operatively connected to the at least one memory, and configured to execute the instructions to perform operations for determining similarity of online items, the operations including:
      extracting and storing, in a data store, one or more images and text from each web page of a plurality of web pages associated with an item of a plurality of items, wherein the one or more images and text from each web page are stored relative to one another according to a data structure;
      receiving, from a browser extension application executing on a computing device, an identifier of a first web page navigated to by a browser executing on the computing device, wherein the first web page is associated with a first item;
      extracting one or more images and text from the first web page;
      receiving, from the data store, one or more images and text from a second web page of the plurality of web pages associated with a second item of the plurality of items;
      providing the one or more images and the text from the first web page and the one or more images and the text from the second web page as input to a machine learning model trained to predict whether the first item and the second item are a same item;
      receiving, as output from the machine learning model, a probability at or above a predefined threshold that the first item and the second item are the same item;
      generating a notification indicating identification of the second item as the same item as the first item and including information associated with the second item;
    selecting, from the plurality of web pages, a third web page associated with a third item from the plurality of items for which one or more images and text of the third web page are provided as input to the machine learning model along with the one or more images and the text from the first web page to predict whether the first item and the third item are a same item, wherein:
      the selection is based on a position of the third web page relative to the second web page within the data structure and the prediction that the first item and the second item are the same item, and
      the notification is updated to indicate identification of the third item as the same item as the first item and including information associated with the third item when the first item and the third item are predicted to be the same item; and
    providing the notification to the browser extension application for display on the computing device.

14. The system of claim 13, wherein providing the one or more images and the text from the first web page and the one or more images and the text from the second web page as input to the machine learning model comprises:
    generating a plurality of vectors, including a vector for each of the one or more images from the first web page, a vector for the text from the first web page, a vector for each of the one or more images from the second web page, and a vector for the text from the second web page; and
    providing the plurality of vectors as the input to the machine learning model.

15. The system of claim 13, wherein the data structure comprises a binary tree structure.

16. The system of claim 13, the operations further comprising:
receiving, as further output from the machine learning model, a confidence level associated with the probability, wherein the probability and the confidence level are at or above the predefined threshold.

17. The system of claim 13, further comprising:
ranking the second item and the third item based on the probability that the first item and the second item are the same item and the probability that the first item and the third item are the same item; and
ordering the information associated with second item and the third item within the notification based on the ranking.

18. The system of claim 17, wherein the ranking is further based on consumer data associated with an account of the browser extension application, the consumer data including one or more of consumer location, consumer preference data, or consumer interaction data.

19. The system of claim 13, wherein the first web page is associated with a first merchant, the second web page is associated with a second merchant that is different from the first merchant, and the third web page is associated with a third merchant that is different from the first merchant and the second merchant.

20. A computer-implemented method for determining similarity of online items, comprising:
extracting and storing, in a data store, one or more images and text from each web page of a plurality of web pages associated with an item of a plurality of items, wherein the one or more images and text from each web page are stored relative to one another according to a data structure, wherein the data structure comprises a binary tree structure;
receiving, from a browser extension application executing on a computing device, an identifier of a first web page navigated to by a browser executing on the computing device, wherein the first web page is associated with a first item;
extracting one or more images and text from the first web page;
receiving, from the data store, one or more images and text from a second web page of the plurality of web pages associated with a second item of the plurality of items;
providing the one or more images and the text from the first web page and the one or more images and the text from the second web page as input to a machine learning model trained to predict whether the first item and the second item are a same item;
receiving, as output from the machine learning model, a probability at or above a predefined threshold that the first item and the second item are the same item;
generating a notification indicating identification of the second item as the same item as the first item and including information associated with the second item, wherein at least a portion of the information in the notification includes or is based on at least one of the one or more images from the second web page or the text from the second web page;
selecting, from the plurality of web pages, a third web page associated with a third item from the plurality of items for which one or more images and text of the third web page are provided as input to the machine learning model along with the one or more images and the text from the first web page to predict whether the first item and the third item are a same item, wherein:
the selection is based on a position of the third web page relative to the second web page within the data structure and the prediction that the first item and the second item are the same item, and
the notification is updated to indicate identification of the third item as the same item as the first item and including information associated with the third item when the first item and the third item are predicted to be the same item; and
providing the notification to the browser extension application for display on the computing device.

* * * * *